A. J. DREMEL.
SOIL MILLING MACHINE.
APPLICATION FILED JUNE 27, 1914.
1,258,882.
Patented Mar. 12, 1918.
2 SHEETS—SHEET 1.
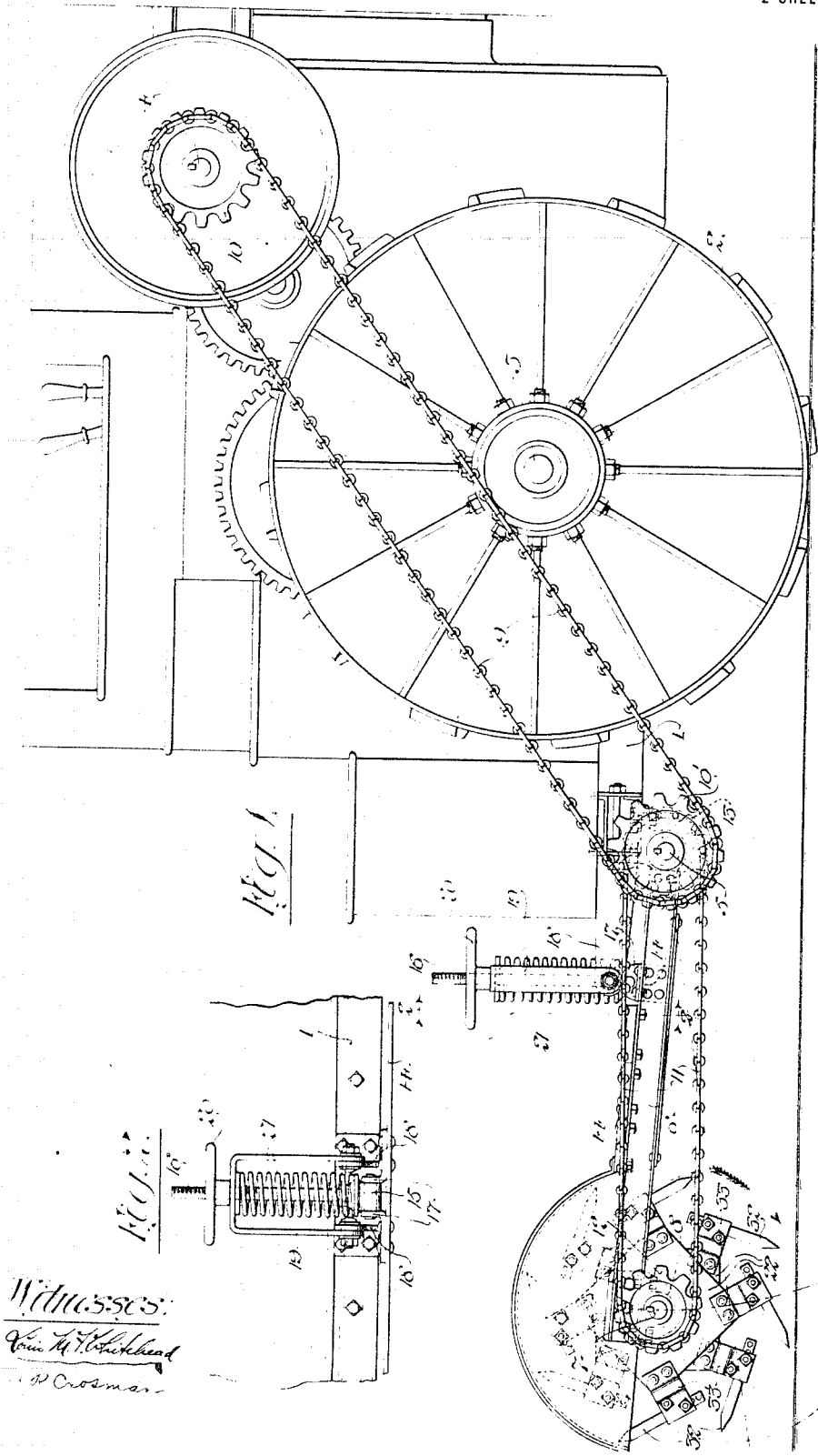

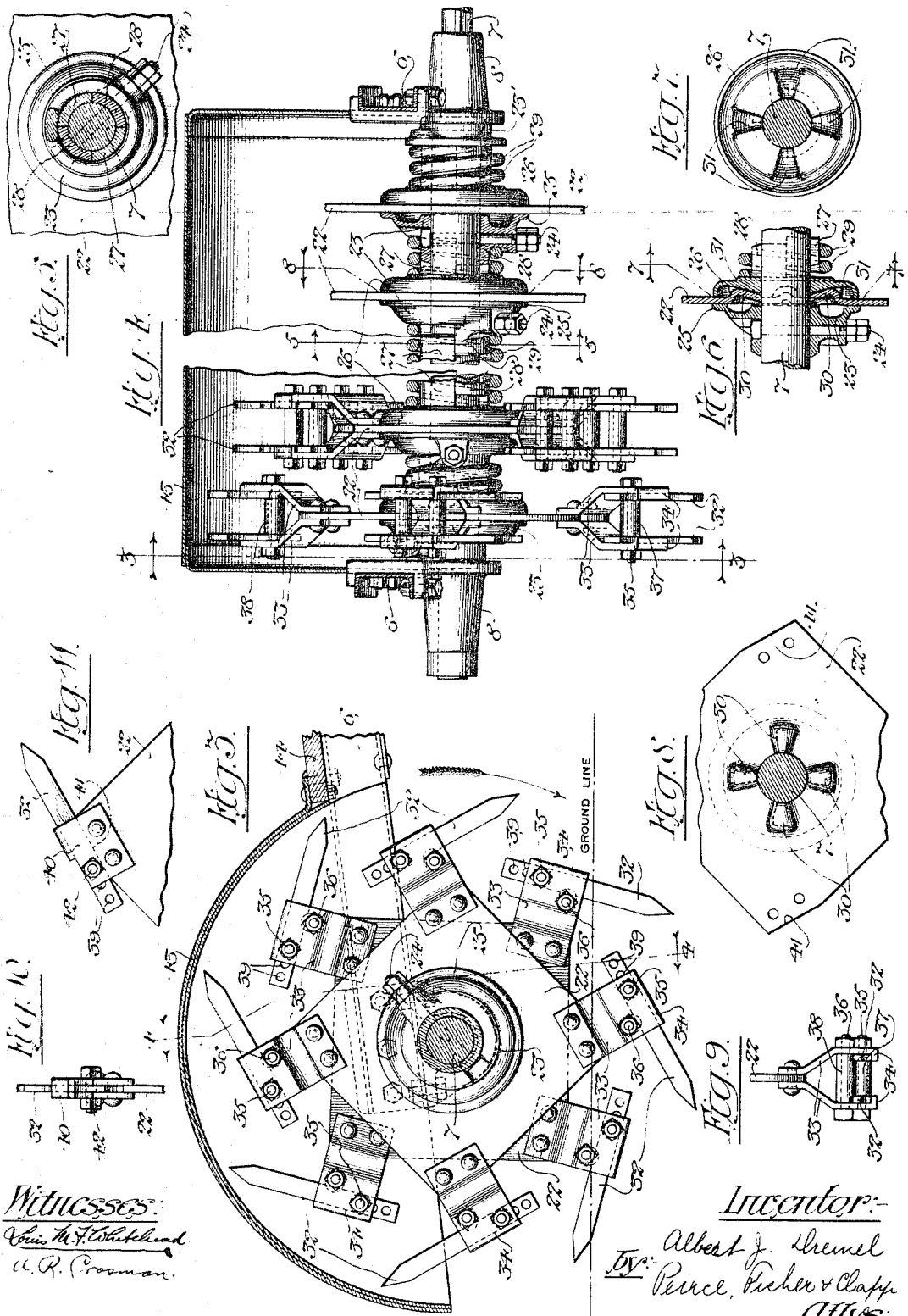

UNITED STATES PATENT OFFICE.

ALBERT J. DREMEL, OF RACINE, WISCONSIN, ASSIGNOR TO J. I. CASE THRESHING MACHINE COMPANY, OF RACINE, WISCONSIN, A CORPORATION.

SOIL-MILLING MACHINE.

1,258,882.

Specification of Letters Patent.

Patented Mar. 12, 1918.

Application filed June 27, 1914. Serial No. 847,594.

*To all whom it may concern:*

Be it known that I, ALBERT J. DREMEL, a subject of the Emperor of Austria-Hungary, and a resident of Racine, county of Racine, and State of Wisconsin, have invented certain new and useful Improvements in Soil-Milling Machines, of which the following is a full, clear, and exact description.

The invention relates to soil milling machines and seeks to provide an improved, power-operated rotary plow or soil milling tool, in which tooth-carrying members are yieldingly connected to a power-operated shaft whereon they are mounted, so that the parts will not be broken when the teeth strike an obstruction. The invention seeks to provide an improved rotary plow which may be connected to and operated from a tractor, together with suitable means for raising or lowering the rotary plow or milling tool to and from rotary position and for yieldingly holding it in working position. The invention consists of the features of improvement hereinafter set forth and illustrated in the preferred form of the accompanying drawings, and more particularly pointed out in the appended claims.

In the drawings, Figure 1 is a side elevation of the improved rotary plow or soil milling machine, and of the rear portion of the tractor to which the machine is connected. Fig. 2 is a detailed view in elevation looking in the direction of the arrows 2—2 of Fig. 1. Fig. 3 is an enlarged detailed section on the line 3—3 of Fig. 4 of the rotary plow or soil milling tool. Fig. 4 is a detailed section on the line 4—4 of Fig. 3. Fig. 5 is a detailed section on the line 5—5 of Fig. 4. Fig. 6 is a detailed section illustrating the manner of yieldingly connecting the knife carrying members or disks to the drive shaft therefor. Fig. 7 is a detailed section on the line 7—7 of Fig. 6. Fig. 8 is a detailed section on the line 8—8 of Fig. 4. Fig. 9 is a detailed view illustrating one form of the knife or tooth holder. Figs. 10 and 11 are edge and side views illustrating another form of knife or tooth holder.

The improved soil milling machine or rotary plow is adapted to be connected to a suitable draft frame. As shown in Fig. 1, it is connected to the rear portion of the frame 1 of a tractor. The latter is provided with traction wheels 2 mounted on a rear axle 3, which is connected by suitable gearing to the drive shaft 4 of the tractor. At the lower rear portion of the tractor or draft frame is journaled a counter shaft 5. The frame of the rotary plow or soil milling tool comprises suitably connected side bars 6, which are hung at their forward ends upon the counter shaft 5. The drive shaft 7 of the soil milling machine is journaled in suitable bearings 8, which are fixed to the rear ends of the frame bars 6. In the form shown, the shaft 7 is driven from the main shaft 4 of the tractor by chain and sprocket gearing. A chain 9 extends from sprocket wheels 10 and 10', connected respectively to the drive shaft 4 and the counter shaft 5. A chain 11 passes over sprocket wheels 12 and 13, which are fixed respectively to the shaft 7 and the counter shaft 5. Other suitable means may be provided for driving the shaft 7 as the soil milling machine is drawn forwardly over the ground.

Suitable means are provided for raising and lowering the milling machine. As shown, a cross bar 14 extends between the side bars 6, and the lower, enlarged end or head 15 of a screw 16 is pivotally connected to lugs 17 on the cross bar. Brackets 18 project rearwardly from the tractor frame, and a vertically disposed yoke 19 is pivotally connected at its lower end to the brackets 18. The screw 16 extends through the upper portion of the yoke and a hand-wheel 20 is threaded on the screw into engagement with the yoke to raise and lower the soil milling tool. Preferably as shown, a spring 21 is coiled about the screw and bears against the lower headed end 15 thereof and the upper portion of the yoke. This spring serves to yieldingly hold the soil milling tool in working position indicated in dotted lines in Fig. 1, and in full lines in Fig. 3.

A series of knife or tooth-carrying members are loosely mounted upon the power-operated drive shaft 7. These tooth-carrying members are preferably in the form of sheet metal plates or disks 22. The disks 22 abut against a series of spacing members or washers 23, which are fixed to the shaft by bolts 24. The faces of the washers adjacent to the disks are preferably dished as shown, and are provided with edge flanges 25 against which the disks abut. The washer 23 formed at the extreme righthand end of the shaft 7 is not adjacent one of the disks and is not provided with an abutting flange.

The disks are yieldingly connected to the drive shaft 7 by a series of clutch members 26, which are interposed between the washers and the disks. The clutch members have a sliding axial movement upon the shaft 7, but are connected to the shaft to rotate therewith, and the clutch members and disks are provided with engaging parts for yieldingly connecting the disks to the shaft. Preferably as shown, the hub portions of the washers 23 and clutch members 26 comprise interlocking segments 27 and 28, so that the clutch members can slide in axial direction, but are compelled to rotate with the drive shaft 7 since the washers are fixed thereto, as stated, by means of the bolts 25. Coiled springs 29 are interposed between the washers 23 and clutch members 26, and encircle the segmental hub portions 27 and 28 thereof, and these springs serve to press the clutch members in axial direction into engagement with the disks 22.

The abutting faces of the clutch members and disks are provided with rounded interlocking lugs and seats for yieldingly connecting the disks to the shaft 7. In the construction shown, the disks are formed of sheet metal, and the central portion of each disk or plate is shaped in a suitable die to form one or more rounded lugs 30, as most clearly shown in Figs. 6 and 8. Preferably each disk is provided with a circular series of lugs, four in number, in the form shown. The working face of each clutch member is provided with a corresponding series of rounded seats 31 for the lugs 30.

In operation the interlocking lugs and seats of the disks and clutch members serve to connect the disks to the shaft 7, so that the disks and knives or teeth carried thereby rotate with the shaft. But inasmuch as the lugs and seats 30 and 31 are rounded or cam shaped, each disk is free to yield in case any of the knives carried thereby strike an obstruction. Thus if the teeth upon one of the disks strike an obstruction, the disk will be held against rotation, and inasmuch as the corresponding clutch member continues its rotary movement, it will be forced by the cam shaped lugs 30 in axial direction against the pressure of the corresponding spring 29. But when the seats 31 of the clutch member again register with the lugs 30, the spring 29 will force the clutch member back into normal position to again connect the tooth-carrying disk to the shaft. In this way breakage of the parts is avoided.

The knives or teeth 32 are arranged in a substantially tangential position at the edges of the disks or plates 22. In the construction shown, the disks are square in outline, and each is provided with a series of four knife holders connected to the corners thereof. In the construction shown in Figs. 3, 4 and 9, each knife holder comprises a pair of flaring plates 33 having inturned flanges 34 at their outer edges. The knives or teeth 32 abut against the inner faces of the plates 33 and flanges 34 and are held in place by bolts 35 and 36 which extend between the plates 33, and which are provided with spacing sleeves 37 and 38. As shown, the bolts 35 are arranged to engage one of a series of openings 39 in each tooth or knife 32, so that the knives may be longitudinally adjusted in the knife or tooth holder. The sleeves 38 about the bolts 36 are provided with suitable seats for the inner edges of the knives, so that the knives are securely held in position.

A form of holder for a single knife or tooth is shown in Figs. 10 and 11. This holder 40 is U-shaped, and serves to hold the tooth in place against the inclined seat 41 at the corner of the disk. A bolt 42 extends through the holder and through one of the longitudinal row of openings 39 in the tooth and provides a means by which the tooth can be longitudinally adjusted.

The improved soil milling machine is intended to do work similar to that effected by the ordinary plow. As the knives or teeth are rotated by the power-operated shaft, they effectively break up and pulverize the soil. If any tooth strikes an obstruction, it will yield as described, so that the parts are not broken. Preferably the upper portion of the sets of knives or teeth are inclosed within a semi-cylindrical shield 43, which is suitably fixed to the rear ends of the side bars 6. Preferably also a platform 44 is mounted on side bars in front of the shield.

It is obvious that changes may be made in the details set forth without departure from the essentials of the invention as defined in the claims.

I claim as my invention:

1. In a soil milling machine, the combination with a drive shaft, of a tooth-carrying member loose on said shaft, a coöperating clutch member connected to said shaft to rotate therewith, and a spring pressing one of said members in axial direction into engagement with the the other member, said members having a rounded interlocking lug and seat for yieldingly connecting said tooth-carrying member to said shaft.

2. In a soil milling machine, the combination with a power operated shaft, of a tooth-carrying member loosely mounted on said shaft, a coöperating axially-movable clutch member on said shaft and connected to rotate therewith, and a spring for forcing said clutch member into engagement with said tooth-carrying member, said members having rounded interlocking lugs and seats for yieldingly connecting said tooth-carrying member to said shaft.

3. In a soil milling machine, the combination with a vertically movable frame and a power-operated shaft journaled in said frame, of a series of tooth-carrying members loosely mounted on said shaft, and a series of axially-sliding, spring-pressed clutch members mounted on said shaft and connected to rotate therewith, said members having rounded interlocking lugs and seats for yieldingly connecting said tooth-carrying members to said shaft.

4. In a soil milling machine the combination with a power-operated shaft, of a plurality of tooth-carrying disks loosely mounted on said shaft, washers fixed to said shaft and against which said disks abut, and spring-pressed clutch members interposed between said disks and said washers and having a sliding interlocking engagement with said washers and a yielding interlocking engagement with said disks.

5. In a soil milling machine the combination with a power-operated shaft, of a plurality of tooth-carrying disks loosely mounted on said shaft, washers fixed to said shaft and against which said disks abut, clutch members interposed between said disks and said washers and having a sliding interlocking engagement with the latter, and coiled springs interposed between said washers and said clutch members for pressing the latter toward said disks, said clutch members and disks having rounded interlocking lugs and seats for yieldingly connecting the latter to said shaft.

6. In a soil milling machine, the combination with a power operated shaft, a series of disks loosely mounted thereon, a series of spring actuated clutch members yieldingly connecting said disks to said shafts, a series of projecting tooth holders fixed to each of said disks, tooth clamping members mounted on each of said holders, longitudinally adjustable teeth in said clamping members, and clamp bolts for holding said teeth in position.

7. In a soil milling machine, the combination with a power-operated shaft of a disk mounted on said shaft and yieldingly connected thereto, a series of tooth-holders fixed to said disk, each comprising a pair of projecting flaring plates, a pair of teeth for each holder, and transverse bolts and spacing sleeves for clamping said teeth in position against said plates.

8. In a soil milling machine, the combination with a power-operated shaft of a disk mounted on said shaft and yieldingly connected thereto, a series of tooth-holders fixed to said disk, each comprising a pair of projecting flaring plates having inturned flanges at their outer edges, a pair of teeth for each holder and transverse bolts and spacing sleeves for adjustably clamping said teeth against said plates with said flanges engaging the outer edges of said teeth.

ALBERT J. DREMEL.

Witnesses:
 WALLACE F. MacGREGOR,
 THEO JOHNSON.